(12) United States Patent
Levander (10) Patent No.: US 8,539,894 B2
(45) Date of Patent: Sep. 24, 2013

(54) MARINE VESSEL PROVIDED WITH VERTICALLY ARRANGED REVOLVING CYLINDERS

(75) Inventor: Oskar Levander, Länsiturunmaa (FI)

(73) Assignee: Wartsila Finland Oy, Vaasa (FI)

( * ) Notice: Subject to any disclaimer, the term of this patent is extended or adjusted under 35 U.S.C. 154(b) by 114 days.

(21) Appl. No.: 13/133,612

(22) PCT Filed: Dec. 2, 2009

(86) PCT No.: PCT/FI2009/050970
§ 371 (c)(1),
(2), (4) Date: Jun. 8, 2011

(87) PCT Pub. No.: WO2010/066946
PCT Pub. Date: Jun. 17, 2010

(65) Prior Publication Data
US 2011/0232555 A1    Sep. 29, 2011

(30) Foreign Application Priority Data
Dec. 8, 2008 (FI) ...................................... 20086175

(51) Int. Cl.
*B63H 21/00* (2006.01)
*B63B 35/00* (2006.01)

(52) U.S. Cl.
USPC ....................................... 114/39.3; 440/89 R (58) Field of Classification Search
USPC .............................. 114/39.3; 440/89 D, 89 R
See application file for complete search history.

(56) References Cited

U.S. PATENT DOCUMENTS

| 2,713,392 | A | | 7/1955 | Karman et al. | |
|---|---|---|---|---|---|
| 4,398,895 | A | | 8/1983 | Asker | |
| 4,421,490 | A | * | 12/1983 | Nakahama | 440/89 R |
| 4,602,584 | A | | 7/1986 | North et al. | |
| 4,881,370 | A | * | 11/1989 | Sakurai et al. | 60/310 |
| 5,514,014 | A | * | 5/1996 | Ogino et al. | 440/75 |

FOREIGN PATENT DOCUMENTS

| CN | 1148561 A | 4/1997 |
|---|---|---|
| JP | 57-55292 | 4/1982 |
| JP | 57-055292 A | 4/1982 |
| JP | 62-203897 A | 9/1987 |
| WO | WO-2006/133950 A1 | 12/2006 |

* cited by examiner

*Primary Examiner* — Stephen Avila
(74) *Attorney, Agent, or Firm* — Muncy, Geissler, Olds & Lowe, PLLC (57) ABSTRACT

The invention relates to a marine vessel (1) comprising a hull (2) and a propulsion arrangement including an internal combustion engine (3), an exhaust gas arrangement (4), and a propulsion unit (5). The marine vessel (1) further is provided with at least one vertically arranged cylinder (6) with a vertical axis, which vertically arranged cylinder (6) is adapted to rotate around its vertical axis. To avoid any substantial increase of windage area, the vertically arranged cylinder (6) is arranged around a part of the exhaust gas arrangement (4) of the marine vessel (1).

9 Claims, 15 Drawing Sheets

MARINE VESSEL PROVIDED WITH VERTICALLY ARRANGED REVOLVING CYLINDERS

CROSS REFERENCE TO RELATED APPLICATIONS

This Application is a National Phase entry of International Application No. PCT/FI2009/050970, filed on Dec. 2, 2009, which claims priority to Finland Patent Application Ser. No. 20086175, filed on Dec. 8, 2008.

TECHNICAL FIELD

The present invention relates to a marine vessel comprising a hull and a propulsion arrangement including an internal combustion engine, an exhaust gas arrangement, and a propulsion unit, which marine vessel further is provided with at least one vertically arranged cylinder with a vertical axis, which vertically arranged cylinder is adapted to rotate around its vertical axis according to the preamble of claim 1.

BACKGROUND ART

Marine vessels provided with vertically arranged revolving cylinders are previously known. A cylinder revolving in the wind will exert pressure at right angles to the wind current. This principle is known as the Magnus law or Magnus effect. Such a cylinder, or rotor, when it is spinning in the wind, generates a low pressure and a high pressure on opposite sides of the cylinder.

As the wind hits a revolving/rotating cylinder from the side, one side of the cylindrical surface naturally goes against the wind, and the other side goes with the wind. There is very little friction on the side that goes with the wind, and much friction on the side that goes against the wind.

On the side that goes against the wind, the velocity of the wind is opposed by the velocity of air adjoining the cylinder, thus retarding the velocity of the wind. This means an increase in pressure. On the other side of the cylinder, the velocity of the wind combines with the velocity of the air layers next to the cylinder, resulting in a decrease of pressure. This leads to a strong force from the increased pressure side to the decreased pressure side, which generates forward thrust in side winds to move the marine vessel.

The above represents a Magnus effect propulsion system, or named after its inventor Dr Anton Flettner, a Flettner rotor.

Such a Flettner rotor does not generate any benefit in head and tail winds. The Flettner rotor generates extra wind resistance as it increases the cross section area of the ship in the wind in sea going operation.

SUMMARY OF INVENTION

An object of the invention is to avoid the disadvantages of prior art and to achieve a marine vessel which provides a means for increasing the forward thrust of the marine vessel at sea in suitable wind conditions. This object is attained by a marine vessel according to claim 1.

The basic idea of the invention is to integrate the vertically arranged cylinder, i.e. the Flettner rotor, with the marine vessel without any noticeable or significant increase of the windage area, i.e. basically the side area and front cross-section area of the marine vessel. The vertically arranged cylinder is arranged around a part of the exhaust gas arrangement of the marine vessel. Thus, the vertically arranged cylinder does not form a separate additional structure on the marine vessel.

Advantageously, the part of the exhaust arrangement is the exhaust pipe. This provides for arranging e.g. the exhaust gas arrangement in various ways with respect to the vertically arranged cylinder. An additional advantage is that such an arrangement improves the design of the marine vessel. Further, the vertically arranged cylinder can provide a funnel means for the exhaust pipe.

The vertically arranged cylinder can advantageously also be provided with an internal support cylinder, which is arranged around the exhaust pipe. The support cylinder may thus provide a funnel means for the exhaust pipe.

Advantageously the vertically arranged cylinder can be directly arranged to act as the exhaust pipe. In this way generally any additional structures aboard the marine vessel are avoided. The vertical utility structure thus basically is an existing vertical structure on the marine vessel, i.e. a structure that is designed for another function.

Advantageously, the vertically arranged cylinder can be arranged around other parts of the exhaust gas arrangement, such as a silencer, in order to save space.

For design and stability, it is advantageous that the vertically arranged cylinder is supported by a frame arranged in connection with an upper end of the vertically arranged cylinder.

The vertically arranged cylinder can also be arranged to extend through the frame, which provides for increased possibilities of utilizing the form of the frame.

The frame can advantageously be provided with a form which directs exhaust gases from the exhaust pipe in a given desired direction.

Further, the frame can be provided with a form which minimizes head wind resistance for the marine vessel.

Preferably, the frame has a horizontal orientation and extends in a longitudinal direction of the marine vessel in order to provide a streamlined design.

BRIEF DESCRIPTION OF DRAWINGS

In the following the invention will be described, by way of example only, with reference to the accompanying schematic drawings, in which.

DETAILED DESCRIPTION

Figure 1:
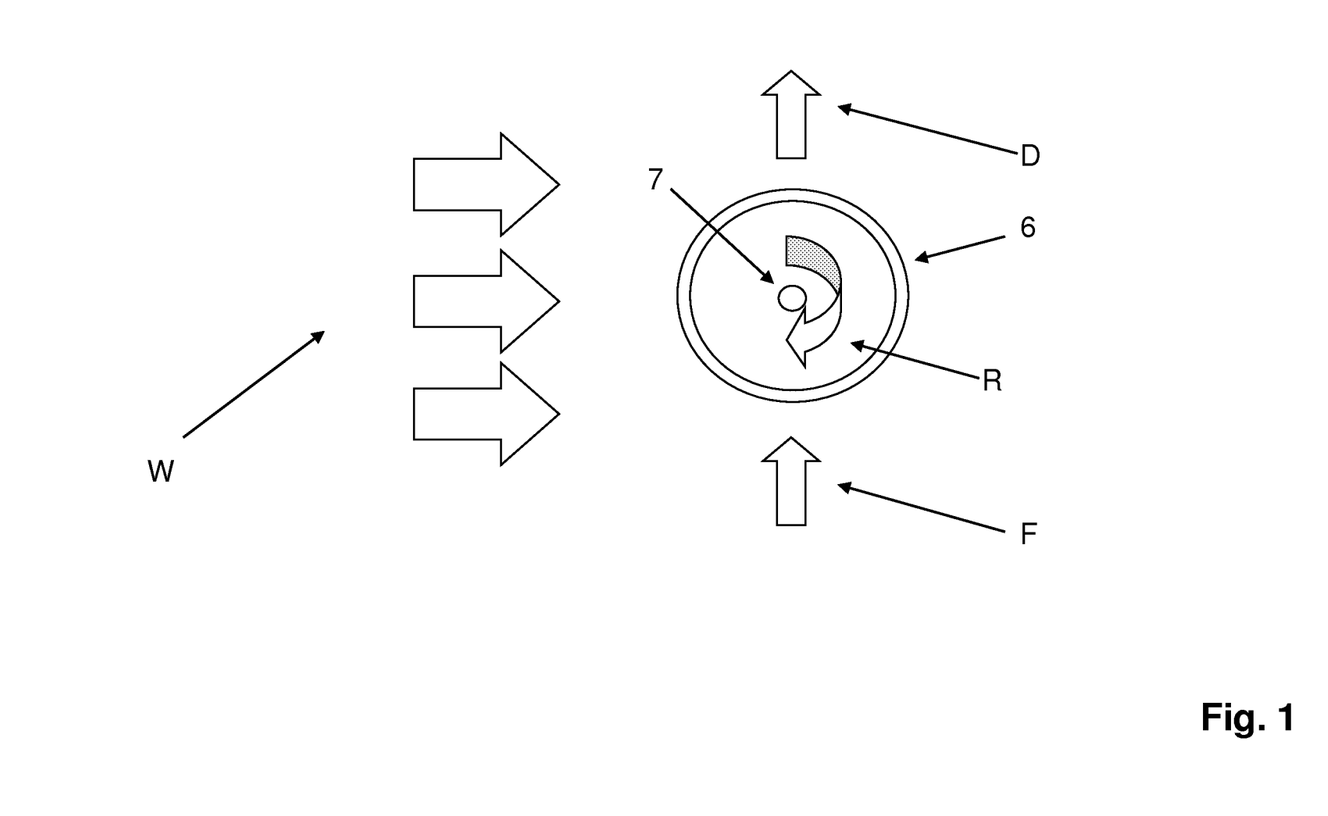
FIG. 1 illustrates the general principle of the present invention.

FIG. 1 illustrates the general principle of the present invention. The vertically arranged cylinder is indicated by reference sign 6 and its vertical axis by reference sign 7. The three parallel arrows show the wind indicated by reference sign W, the curved arrow R indicates the direction of rotation of the vertically arranged cylinder 6 around its vertical axis 7, reference sign F indicates the force, or forward thrust, generated by the Magnus effect discussed above, and reference sign D indicates the resulting direction of movement of the marine vessel (not shown).

The side wind W engages the vertically arranged cylinder 6 which is rotated around its vertical axis 7 by means of a motor (not shown) in direction R, whereby the Magnus effect generates an increased pressure on one side and an decreased pressure, or suction, at the opposite side of the vertically arranged cylinder 6. This results in a force F, or forward thrust, which moves the marine vessel forward in direction D.

Although not shown in FIG. 1, the surface of the vertically arranged cylinder can be given a so-called skin surface. This is advantageous in view of providing that the wind flow will follow the vertically arranged cylinder in a better manner, if some small vortices are generated by a special surface. The vortices do not detach from the vertically arranged cylinder as easy as a laminar flow.

The above described function applies to a marine vessel in seagoing operation. The rotation of the vertically arranged cylinder 6 may of course be in the opposite direction, thus in a corresponding manner providing thrust in the opposite direction.

Figure 2:
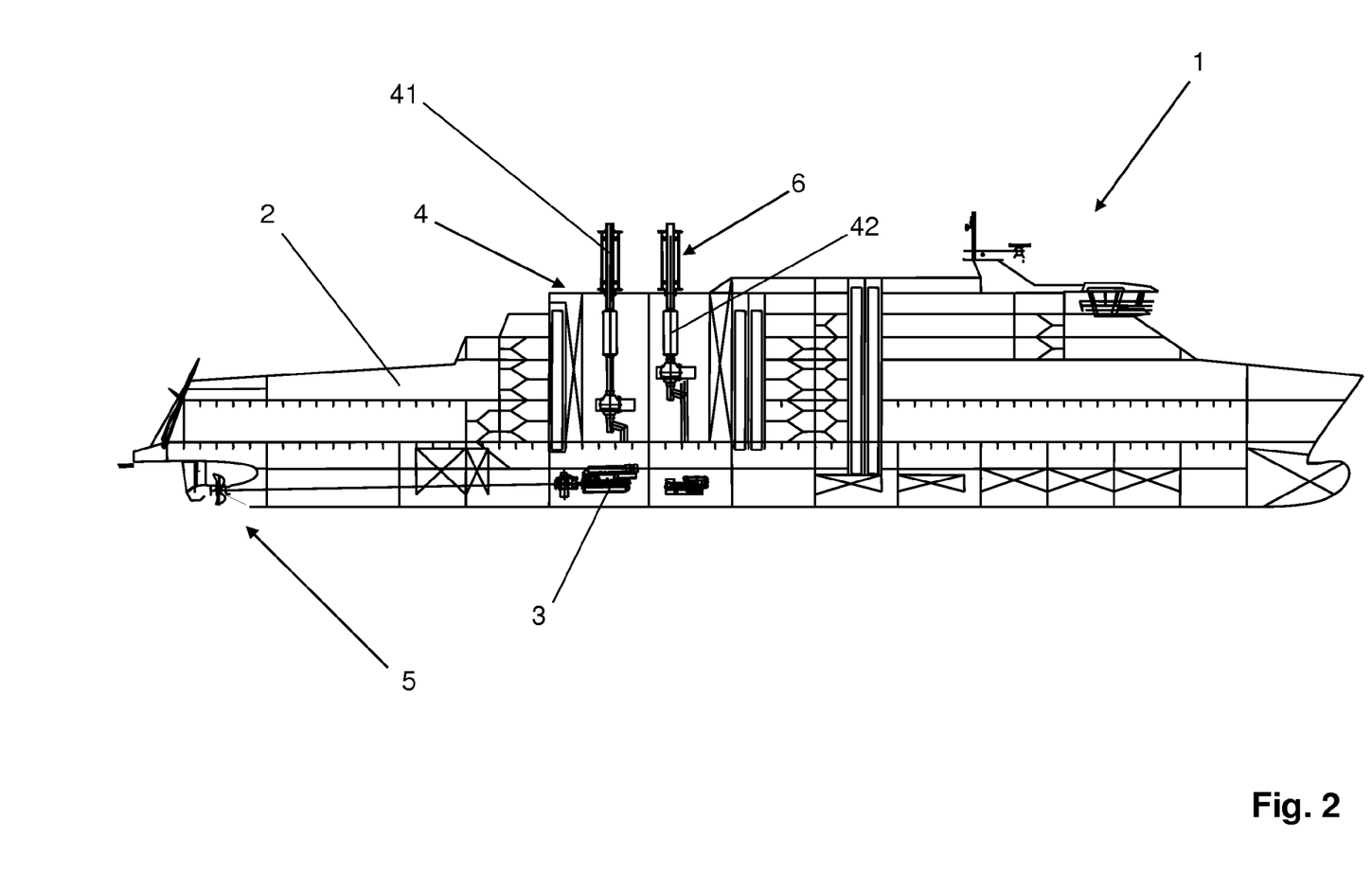
FIG. 2-FIG. 15 illustrate various embodiments of the present invention, in general view and in more detailed view.
Figure 4:
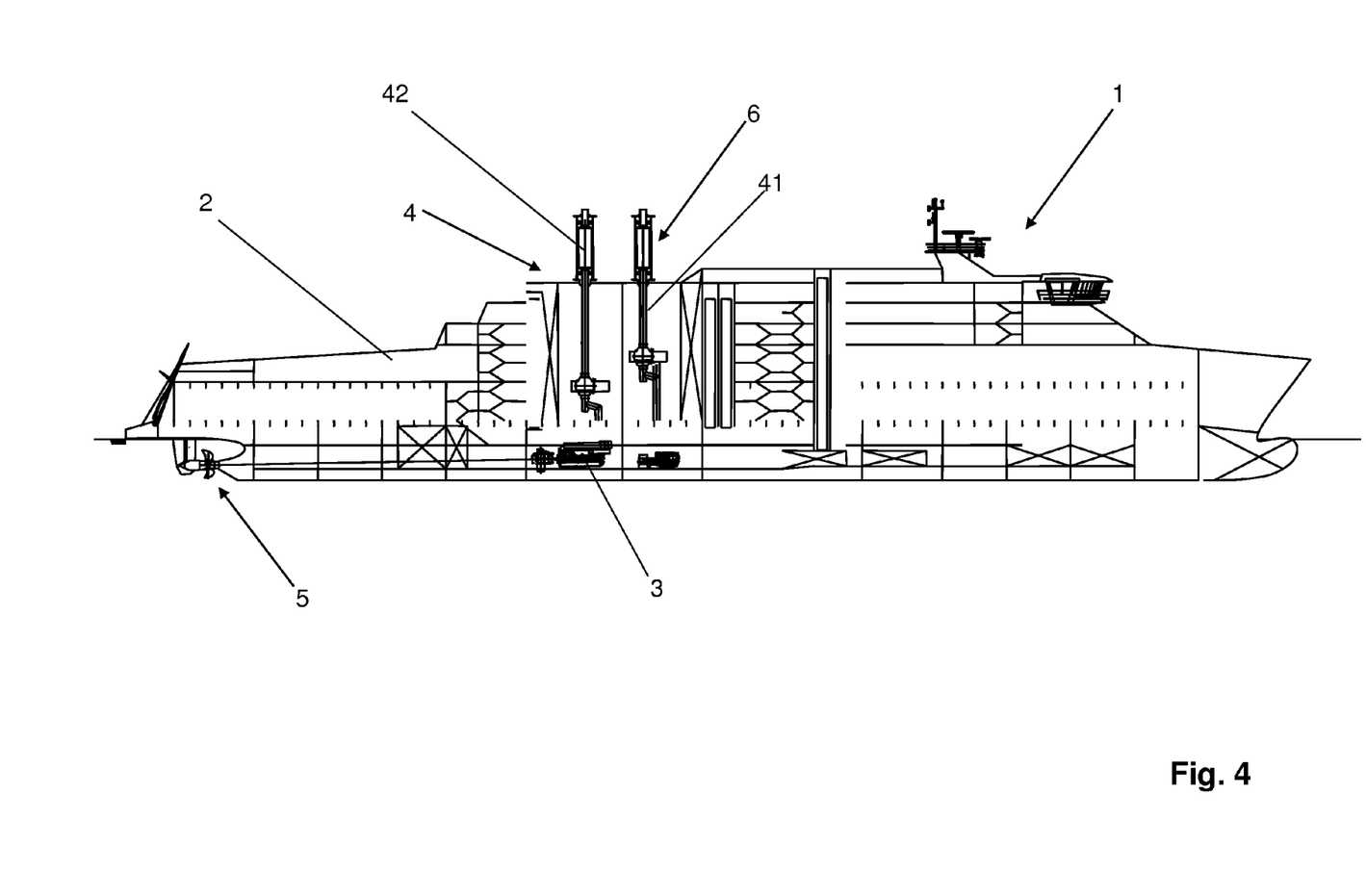

FIG. 2 and FIG. 4 show a marine vessel 1 comprising a hull 2 and a propulsion arrangement including an internal combustion engine 3, an exhaust gas arrangement 4 and a propulsion unit 5. In these embodiments the exhaust arrangement is shown to have two exhaust pipes 41. The exhaust pipes 41 are provided with silencers 42. Further, the marine vessel comprises two vertically arranged cylinders 6 which are arranged to be rotated around their respective vertical axis 7 (FIG. 1). Each vertically arranged cylinder is arranged in connection with or is integrated with a vertical utility structure of the marine vessel 1.

In these embodiments, the vertical utility structure is arranged around a part of the exhaust gas arrangement 4, more particularly the exhaust pipe 41, whereby the vertically arranged cylinder 6 is arranged around the exhaust pipe 41. The exhaust gas arrangement 4 has two exhaust pipes 41 each provided with a vertically arranged cylinder 6. The vertically arranged cylinders 6 are rotated by a motor (not shown) in order to achieve the function described in connection with FIG. 1. The exhaust pipe should usually extend slightly higher up than the vertically arranged cylinder.

The vertically arranged cylinder can be arranged around one or more exhaust pipes depending on the design of the exhaust arrangement.

Figure 3:
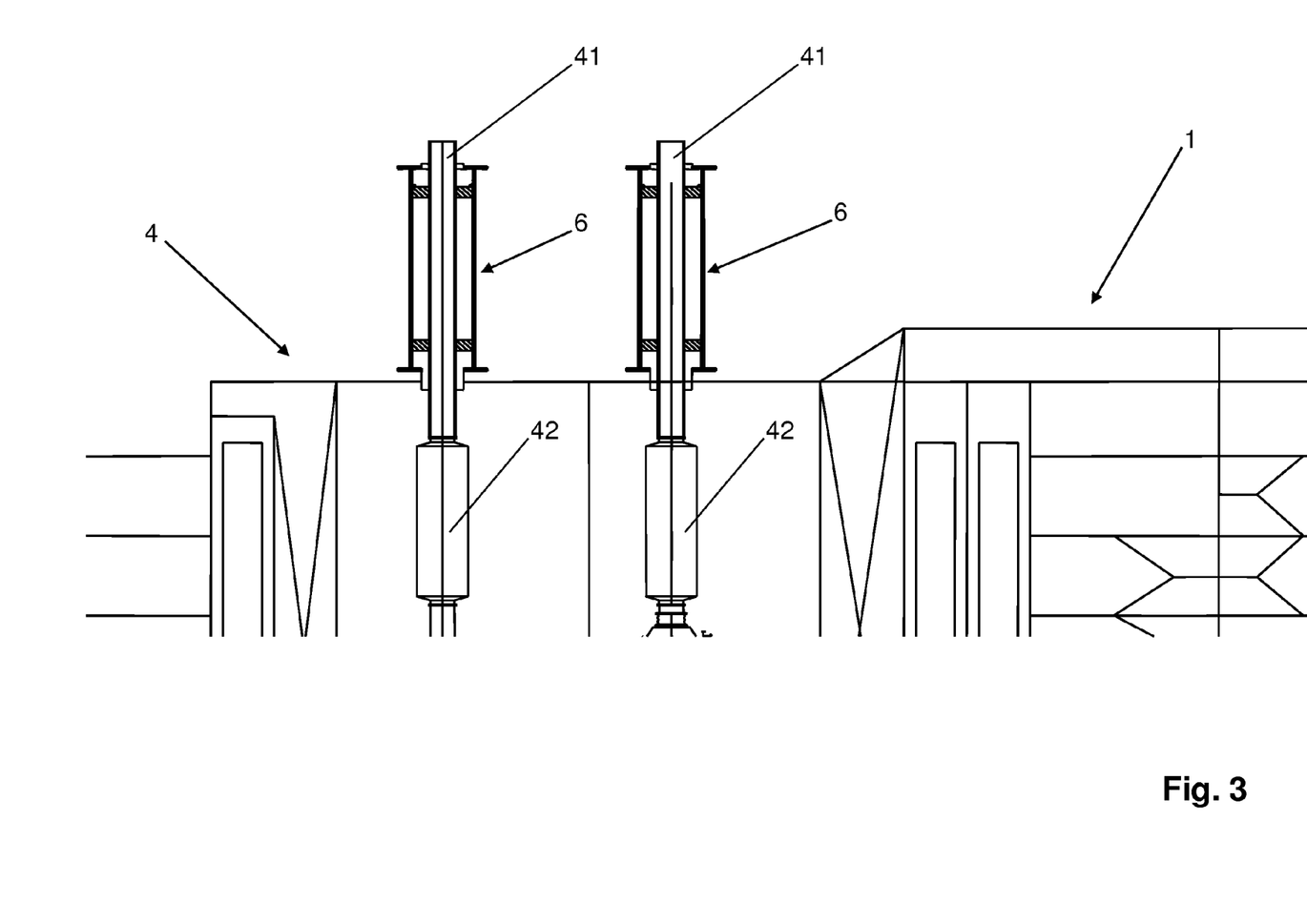

FIG. 3 shows the embodiment of FIG. 2 more in detail. The exhaust gas arrangement 4 of the marine vessel 1 is provided with two exhaust gas pipes 41 around each of which is mounted a vertically arranged cylinder 6 arranged to rotate around its vertical axis 7 (FIG. 1) and the respective exhaust pipe 41. On one hand the exhaust pipes 41 function as a support structure for the vertically arranged cylinders 6. On the other hand, the vertically arranged cylinders 6 provide a funnel means for the exhaust pipes 41.

Figure 5:
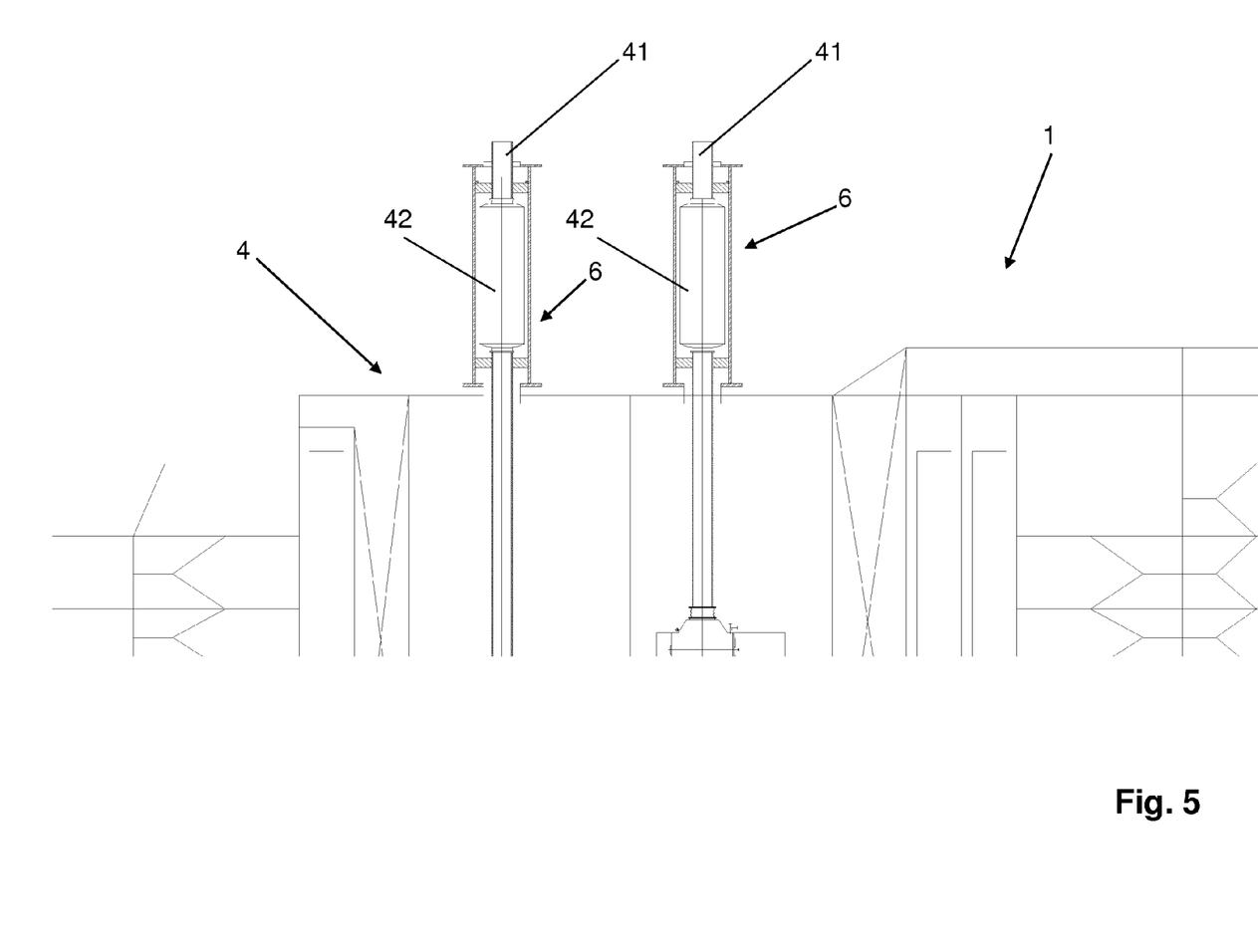

FIG. 5 shows the embodiment of FIG. 4 in more detail. The exhaust gas arrangement 4 of the marine vessel 1 is provided with two exhaust gas pipes 41 around each of which is mounted a vertically arranged cylinder 6 arranged to rotate around its vertical axis 7 (FIG. 1) and the respective exhaust pipe 41. On one hand the exhaust pipes 41 function as a support structure for the vertically arranged cylinders 6. On the other hand, the vertically arranged cylinders 6 provide a funnel means for the exhaust pipes 41. The silencers 42 are also arranged within the vertically arranged cylinders 6 in order to save space.

Figure 6:
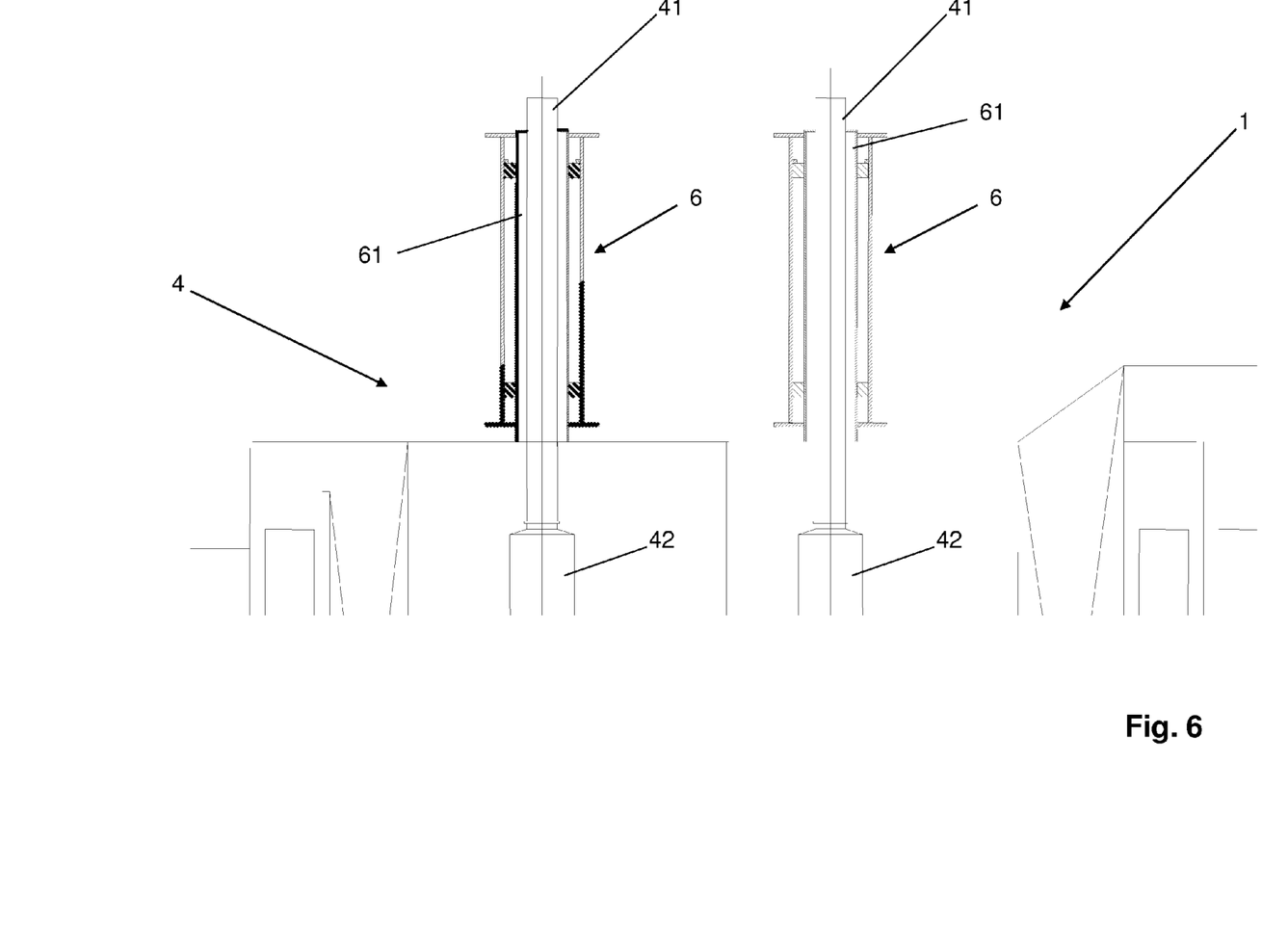

FIG. 6 shows another embodiment of the present invention. In this embodiment, the exhaust gas arrangement 4 of the marine vessel 1 is provided with two exhaust gas pipes 41 around each of which is mounted a vertically arranged cylinder 6 arranged to rotate around its vertical axis 7 (FIG. 1) and the respective exhaust pipe 41. The exhaust pipes 41 are provided with silencers 42. The exhaust pipes 41 are arranged inside an internal support cylinder 61 for the respective vertically arranged cylinder 6. The support cylinders 61 provide a funnel means for the exhaust pipes 41.

Figure 7:
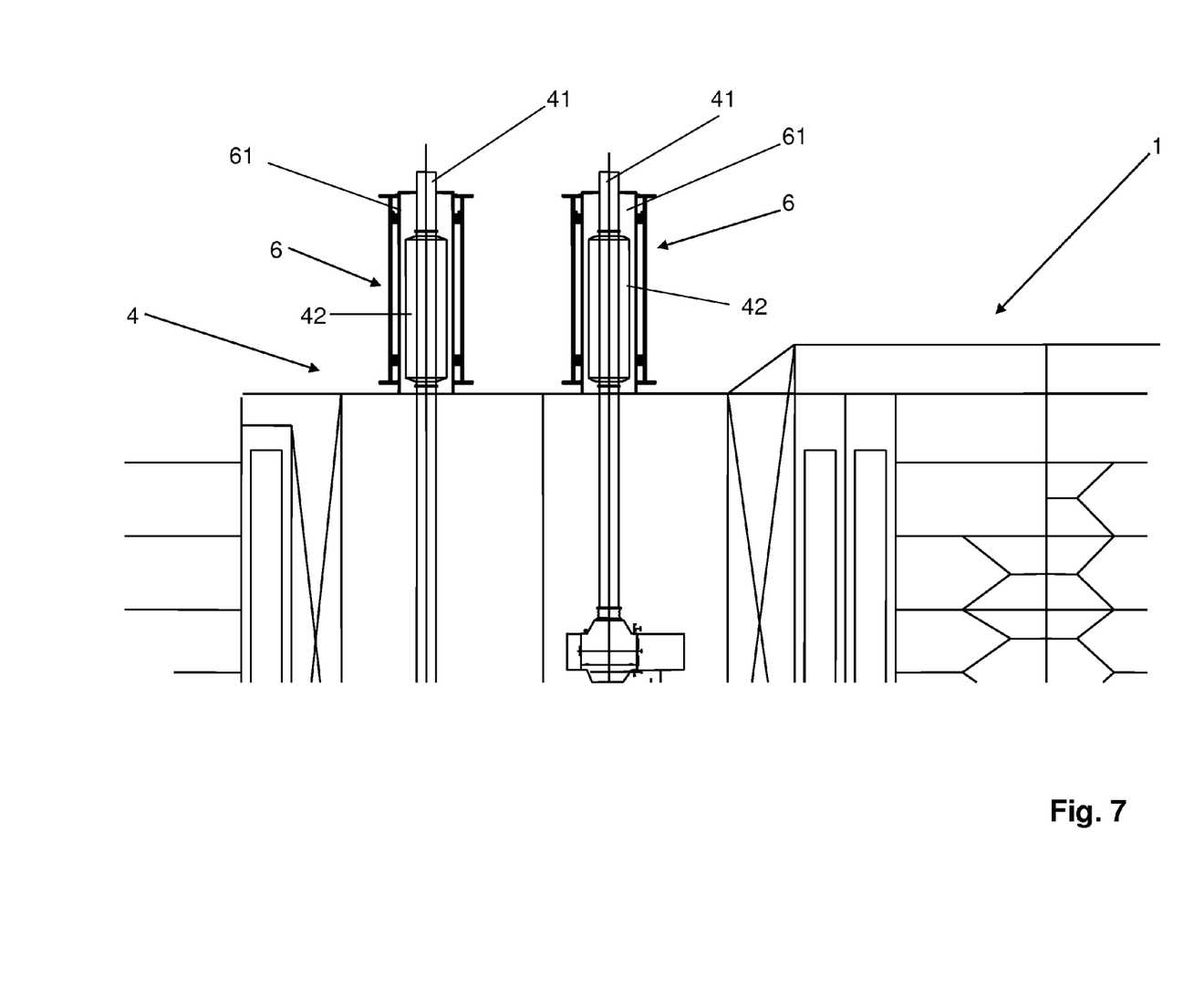

FIG. 7 shows an alternative to the embodiment of FIG. 6 where the silencers 42 are arranged within the internal support cylinders 61 of the vertically arranged cylinders 6 in order to save space.

Figure 8:
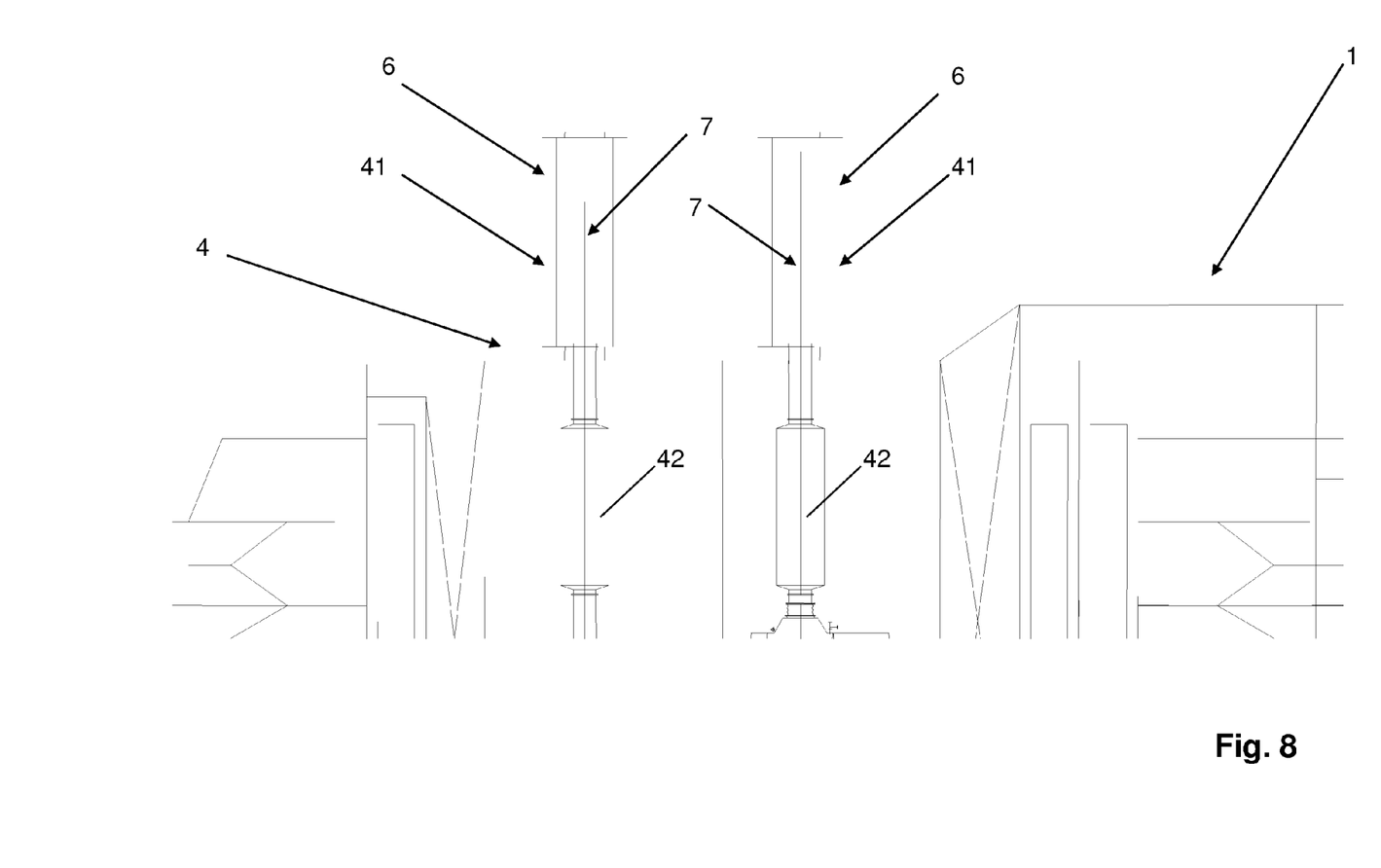

FIG. 8 shows an additional embodiment of the present invention. In this embodiment, the exhaust gas arrangement 4 of the marine vessel 1 is provided with two exhaust gas pipes 41. Each exhaust pipe 41 is formed of a vertically arranged cylinder 6 arranged to rotate around its vertical axis 7. The vertically arranged cylinder thus is arranged to act as the exhaust pipe 41. The exhaust pipes 41 are provided with silencers 42.

Figure 9:
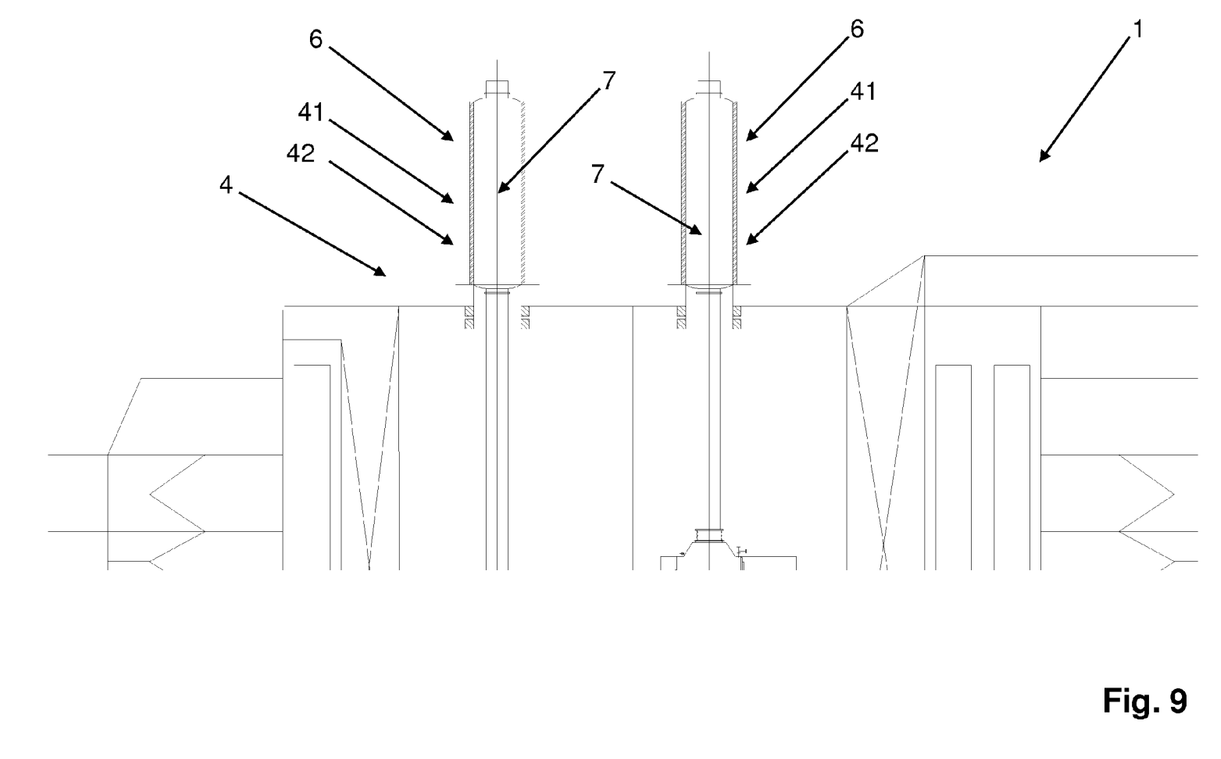

FIG. 9 shows an alternative to the embodiment of FIG. 8, where each exhaust pipe 41 with its respective silencer 42 is formed of a vertically arranged cylinder 6 arranged to rotate around its vertical axis 7. The vertically arranged cylinder 6 thus is arranged to act as the exhaust pipe 41 and silencer 42 at the same time.

Figure 10:
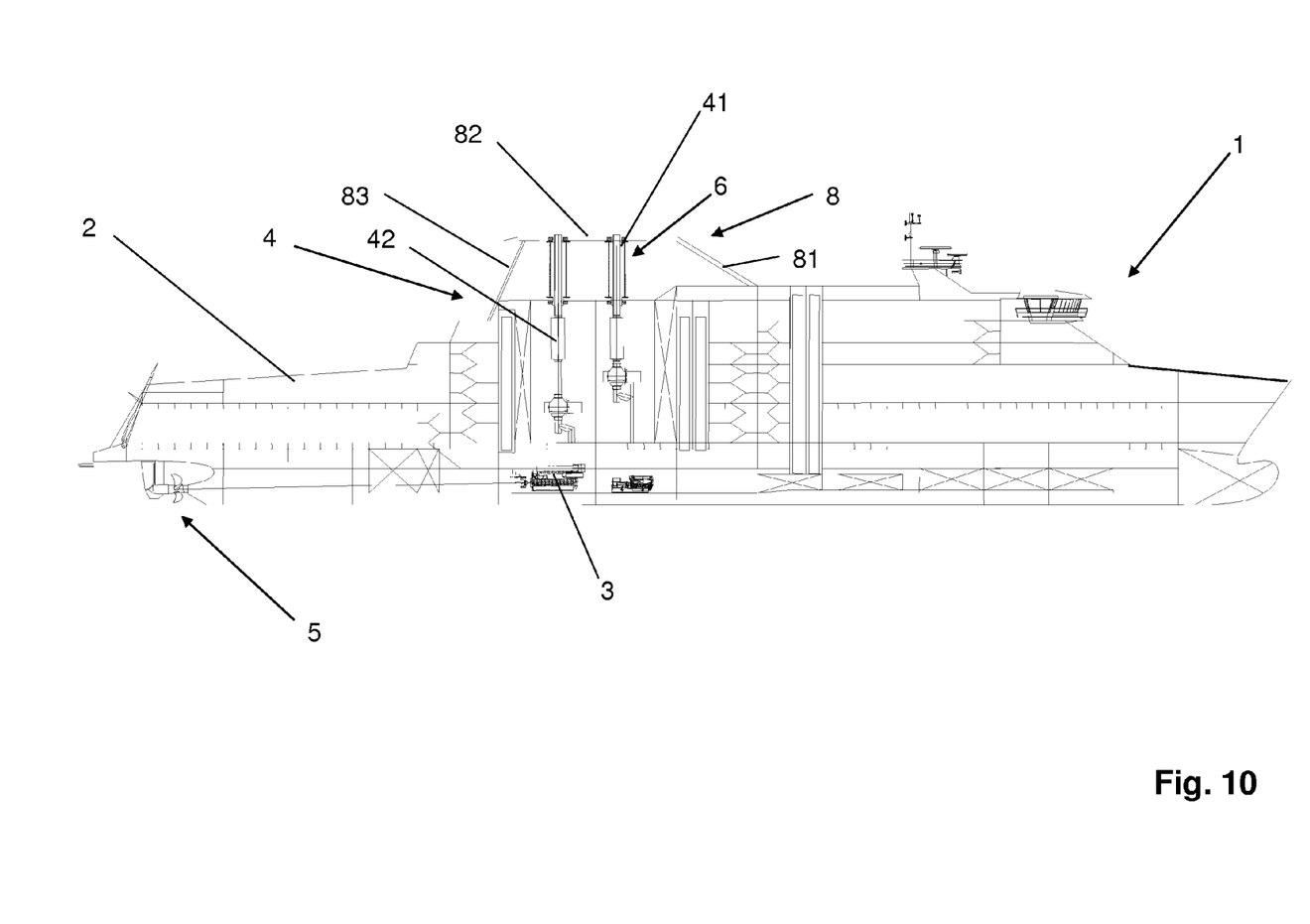

FIG. 10 shows a marine vessel 1 comprising a hull 2 and propulsion arrangement including an internal combustion engine 3, an exhaust gas arrangement 4 and a propulsion unit 5. The exhaust arrangement is shown to have two exhaust pipes 41. The exhaust pipes 41 are provided with silencers 42. Further, the marine vessel comprises two vertically arranged cylinders 6 which are arranged to be rotated around their respective vertical axis 7 (FIG. 1). The vertically arranged cylinder is arranged in connection with or integrated with a vertical utility structure of the marine vessel 1.

In this embodiment, the vertical utility structure is the exhaust pipe 41, whereby the vertically arranged cylinder 6 is arranged around the exhaust pipe 41. The exhaust gas arrangement 4 has two exhaust pipes 41 each provided with a vertically arranged cylinder 6. The vertically arranged cylinders 6 are rotated by a motor (not shown) in order to achieve the function described in connection with FIG. 1.

Figure 11:
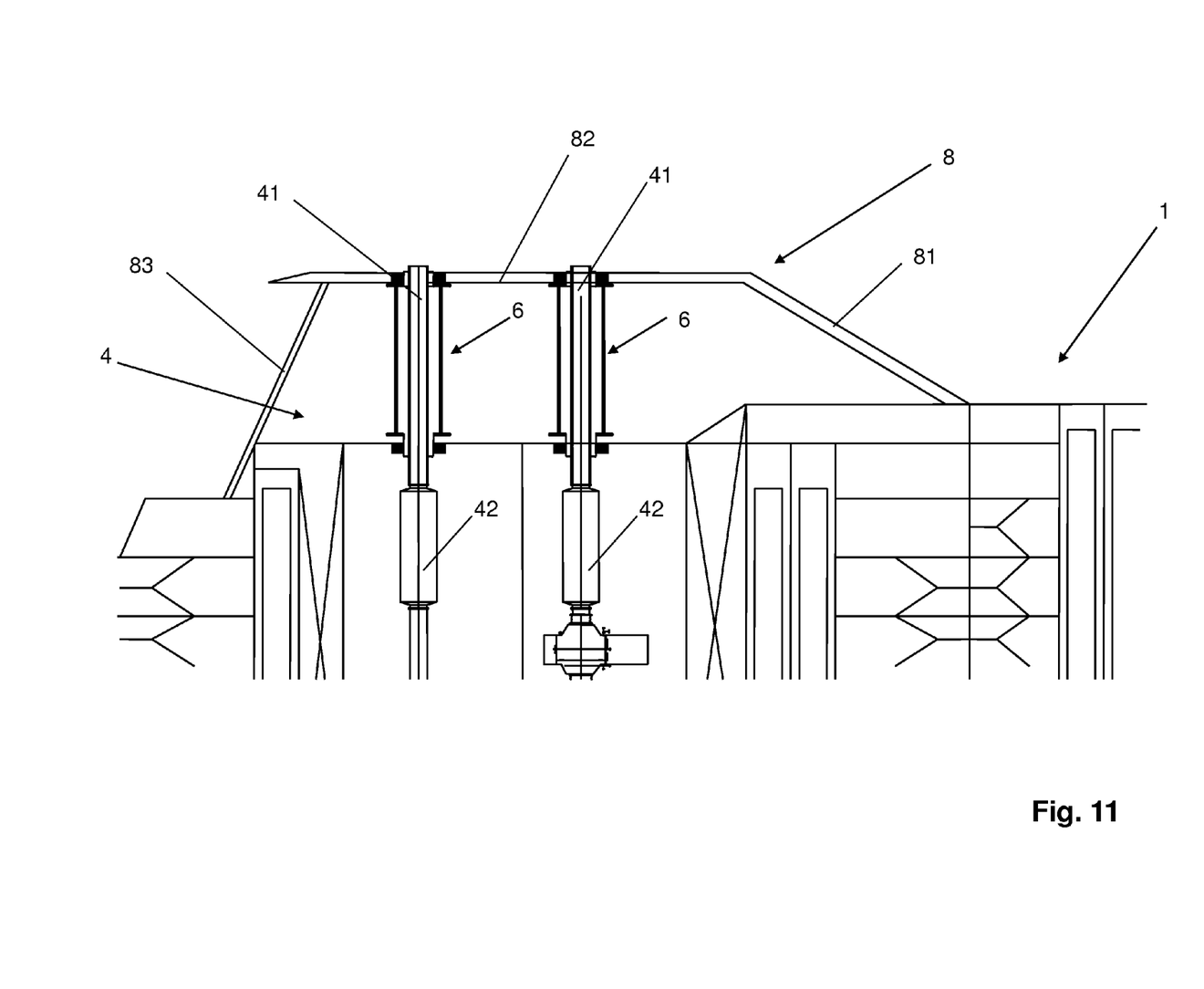

FIG. 11 shows the embodiment of FIG. 10 more in detail. The exhaust gas arrangement 4 of the marine vessel 1 is provided with two exhaust gas pipes 41 around each of which is mounted a vertically arranged cylinder 6 arranged to rotate around its vertical axis 7 (FIG. 1) and the respective exhaust pipe 41. The exhaust pipes 41 are provided with silencers 42. On one hand the exhaust pipes 41 function as a support structure for the vertically arranged cylinders 6. On the other hand, the vertically arranged cylinders 6 provide a funnel means for the exhaust pipes 41. This corresponds to the embodiment discussed above in connection with FIG. 2 and Fig. and FIG. 3 above.

The vertically arranged cylinders 6 extend generally to the same height as the vertical height of the vertical utility structure of the marine vessel 1. The two vertically arranged cylinders 6, and consequently also the two exhaust pipes 41, are arranged to be supported by the frame 8 arranged at an upper end of the vertically arranged cylinders. The frame 8 comprises a front portion 81 (towards the bow of the marine vessel 1, a substantially horizontal portion 82 extending along the exhaust pipes 41/the vertically arranged cylinders 6, and a aft portion 83 (towards the stern of the marine vessel 1). The frame 8 has a generally horizontal orientation and extends in the longitudinal direction of the marine vessel 1 and it is arranged on top of the vertically arranged cylinders 6. The frame 8 can e.g. comprise two horizontally oriented arcs provided with a supporting portion between them which is arranged on top of the vertically arranged cylinders. The exhaust pipe should usually extend slightly higher up than the vertically arranged cylinder and the support cylinder.

Thus, it is advantageous to provide the frame 8 with a form which directs the wind flow to direct the exhaust gases from the exhaust pipes 41 in a given desired direction. Further, it is advantageous to provide the frame 8 with a form that minimizes head wind resistance for the marine vessel 1. Also, it does not hinder the wind to engage the vertically arranged cylinders 6. Depending on its design, it can be made to stabilize the wind flow. The frame can also be in the form of a rounded arc, or a part of a rounded arc in view of achieving a streamlined configuration. The frame can also be used to prevent air flow over the top of the cylinder from the increased pressure side to the decreased pressure, i.e. suction side (FIG. 1).

Figure 12:
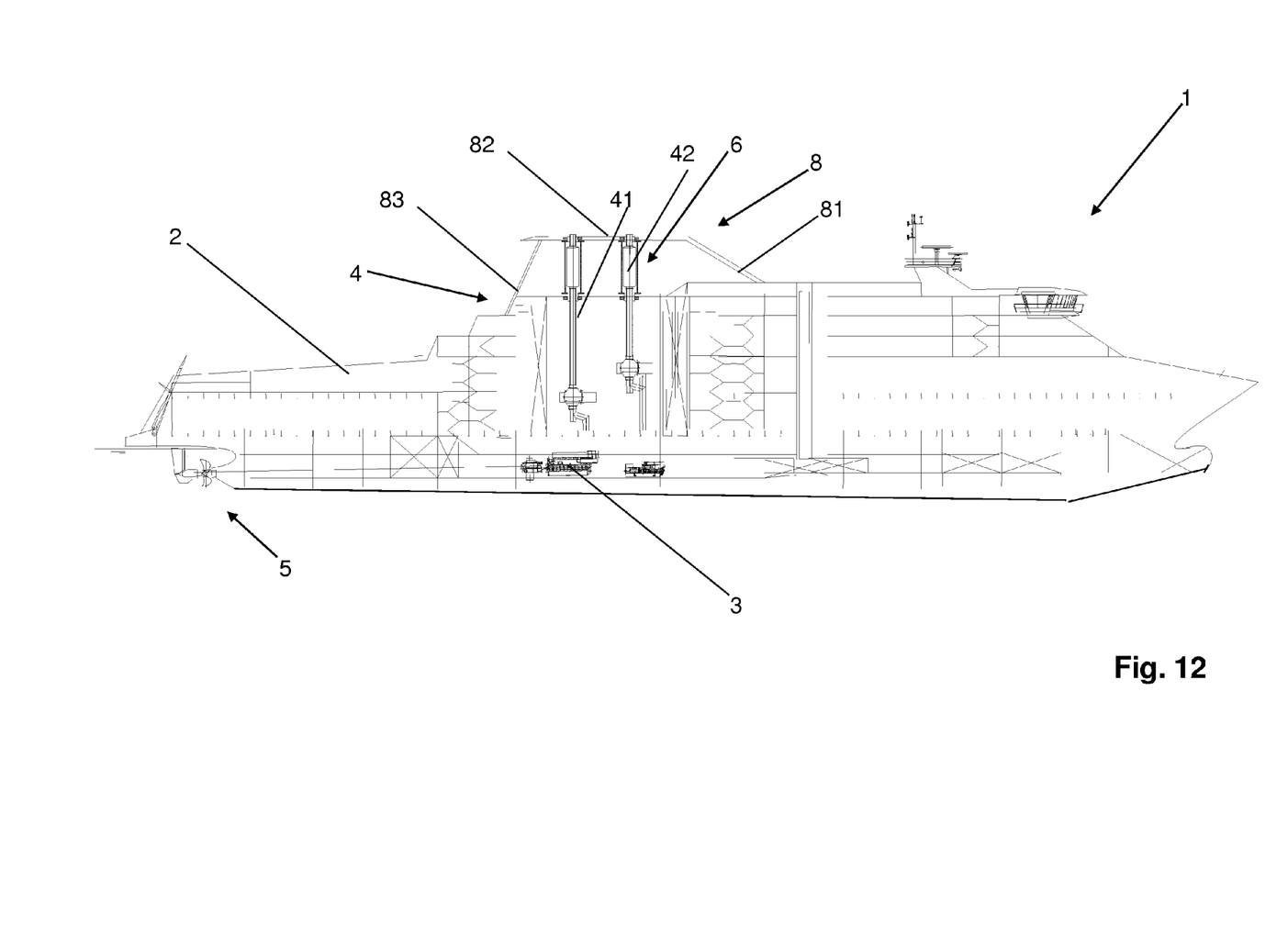

FIG. 12 shows an alternative embodiment of FIG. 10, where the silencers 42 are arranged inside the vertical cylinders 6 in order to save space.

Figure 13:
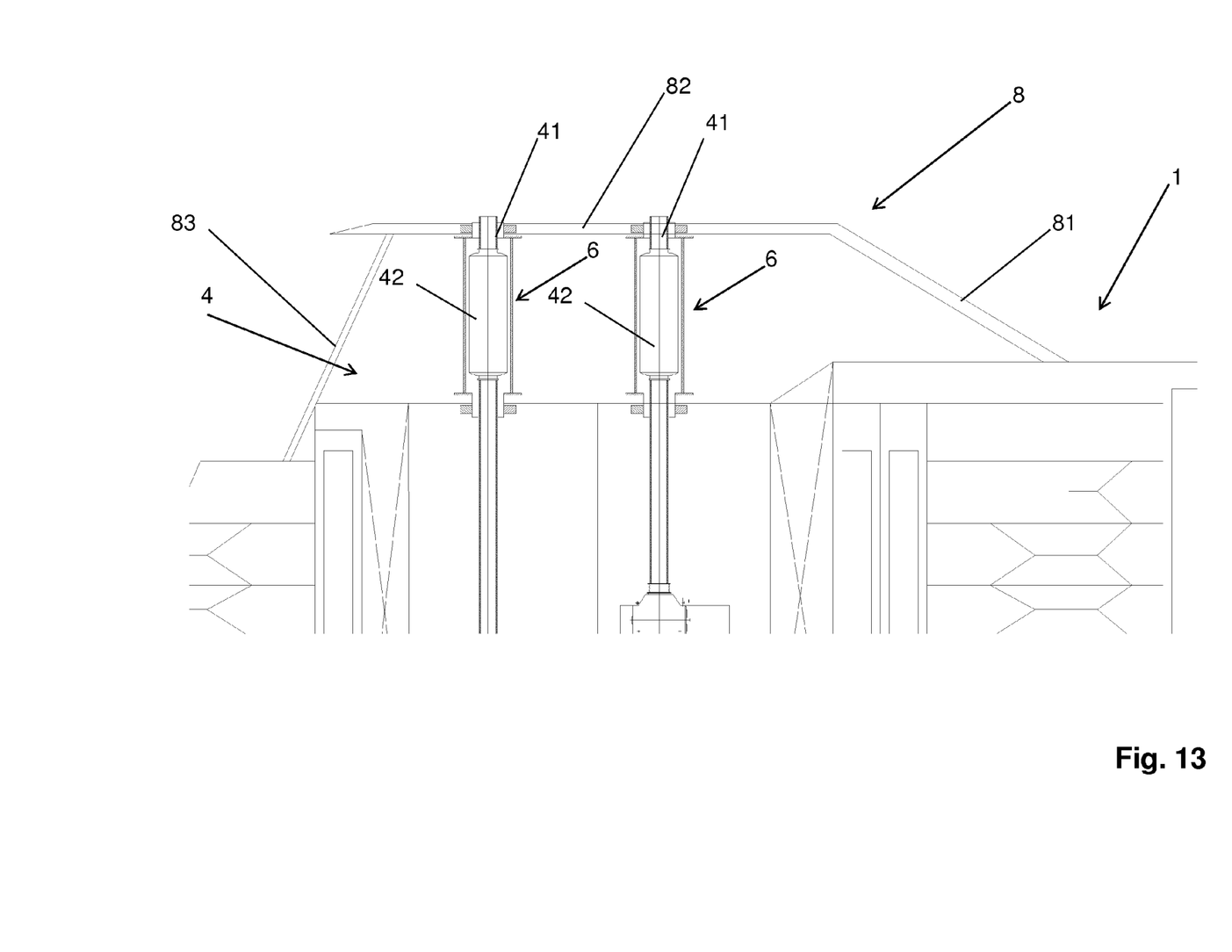

FIG. 13 shows an alternative to the detailed embodiment of FIG. 11, where the silencers 42 are arranged inside the vertical cylinders 6 in order to save space.

Figure 14:
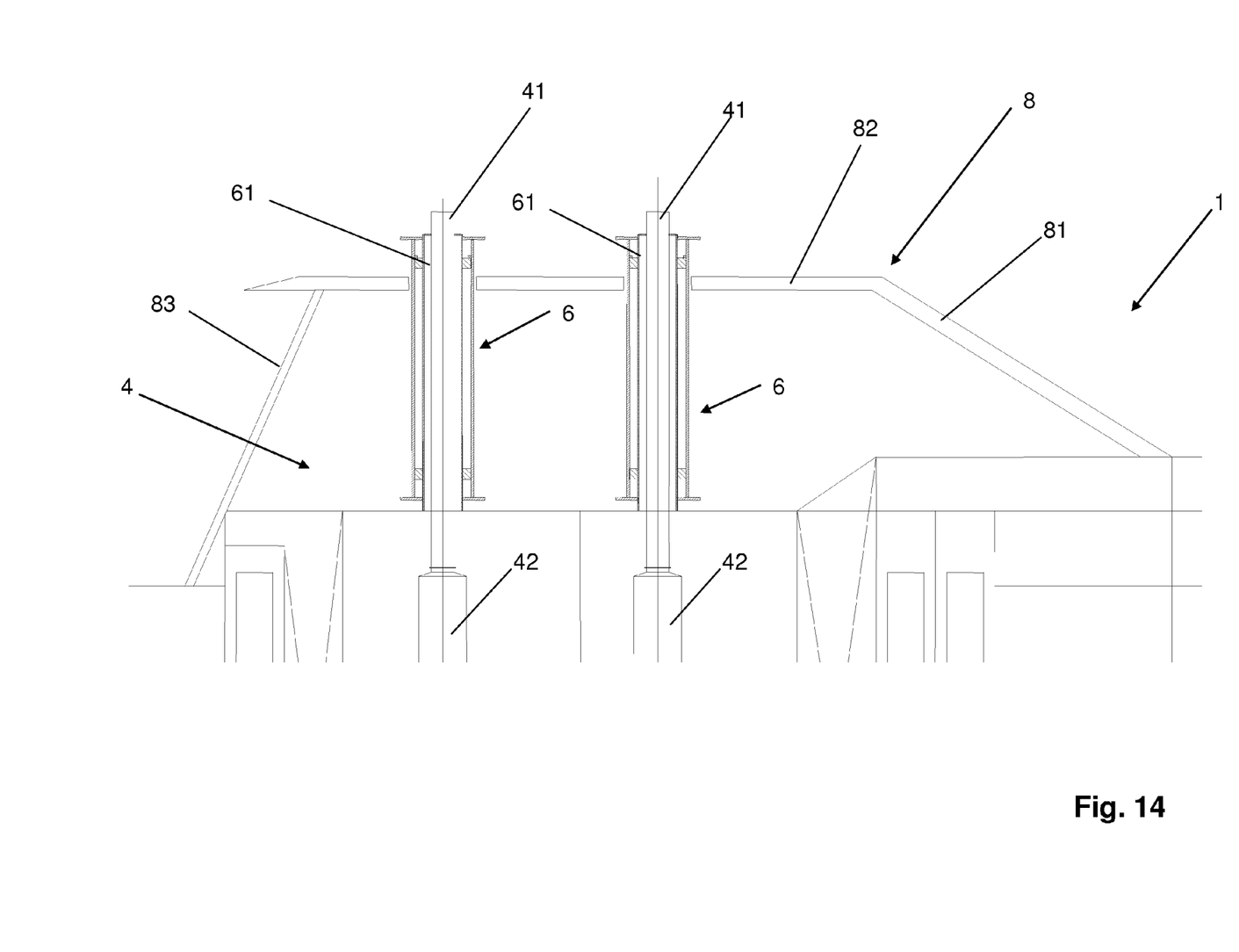

FIG. 14 shows an alternative embodiment of FIG. 11 introducing an alternative arrangement for the frame 8. In this embodiment, the exhaust gas arrangement 4 of the marine vessel 1 is provided with two exhaust gas pipes 41 around each of which is mounted a vertically arranged cylinder 6 arranged to rotate around its vertical axis 7 (FIG. 1) and the respective exhaust pipe 41. The exhaust pipes 41 are provided with silencers 42. The exhaust pipes 41 are separately arranged inside an internal support cylinder 61 of the respective vertically arranged cylinder 6. The support cylinders 61 provide a funnel means for the exhaust pipes 41. This corresponds to the embodiment discussed above in connection with FIG. 4 and FIG. 5.

The two vertically arranged cylinders 6 extend generally to the same height as the vertical height of the vertical utility structure of the marine vessel 1. The exhaust pipe should usually extend slightly higher up than the vertically arranged cylinder and the support cylinder.

In this embodiment, the two vertically arranged cylinders 6, and consequently also the two exhaust pipes 41, are arranged to extend through the frame 8. The frame 8 comprises a front portion 81 (towards the bow of the marine vessel 1, a substantially horizontal portion 82 extending along the exhaust pipes 41/the vertically arranged cylinders 6, and a aft portion 83 (towards the stern of the marine vessel 1). The frame 8 has a generally horizontal orientation and extends in the longitudinal direction of the marine vessel 1. The frame can also be in the form of a rounded arc, or a part of a rounded arc in view of achieving a streamlined configuration.

It is advantageous to provide the frame 8 with a form that minimizes head wind resistance for the marine vessel 1. The frame 8 can also act as a spoiler to direct the wind flow around the vertically arranged cylinders 6. Also, it does not hinder the wind to engage the vertically arranged cylinders 6. Depending on its design, it can be made to stabilize the wind flow. The frame 8 can e.g. comprise two horizontally oriented frame sections provided with a wind flow directing portion between them through which the vertically arranged cylinders extend. The frame can also be used to prevent air flow over the top of the cylinder from the increased pressure side to the decreased pressure, i.e. suction side (FIG. 1).

Figure 15:
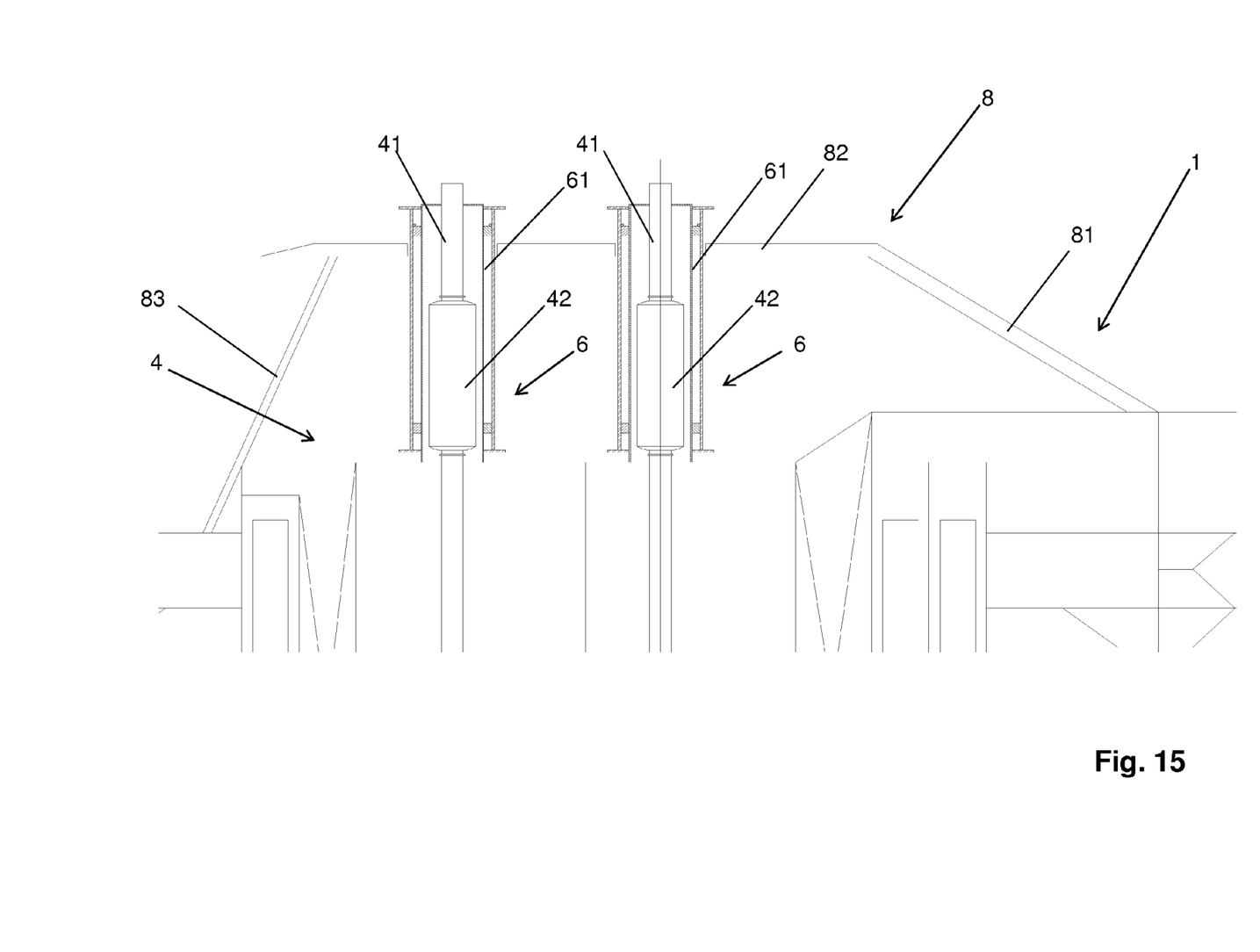

FIG. 15 shows an alternative embodiment of FIG. 14, where the silencers 42 are arranged within the internal support cylinders 61 of the vertically arranged cylinders 6 in order to save space.

In the embodiments discussed above the vertically arranged cylinders are arranged in connection with or integrated with a vertical utility structure of the marine vessel. Consequently, the vertically arranged cylinders do not substantially increase the windage area, i.e. basically the side area and front cross-section area of the marine vessel, in comparison to a marine vessel without said vertically arranged cylinders. Also, there is not a separate added structure to the marine vessel profile. The exhaust pipe should usually extend slightly higher up than the vertically arranged cylinder and the support cylinder.

The vertically arranged cylinder can be arranged around one or more vertical utility structures, e.g. around one or more exhaust pipes and/or silencers depending on the design of the exhaust arrangement.

The vertically arranged cylinder, i.e. Flettner rotor can also be added to other existing vertical structures of the marine vessels. The vertically arranged cylinder can e.g. be arranged in connection with or integrated with a mast on a marine vessel, whereby this provides one or more so-called Flettner rotors without any substantial added structure to the marine vessel profile. Clearly, the vertically arranged cylinder can be arranged one or more of said other existing vertical structures as well depending on the design of the marine vessel.

The number of internal combustion engines, exhaust gas arrangements and propulsion units may vary. Consequently, also e.g. the number of exhaust pipes, silencers, etc. may vary, as well as the number of any vertical utility structures on the marine vessel deployed for the vertically arranged cylinders, i.e. the Flettner rotors. In a corresponding manner, the number of the frame arcs may vary, also in view of how they are arranged with respect to the vertically arranged cylinders. The vertically arranged cylinders are described to be rotated by motors. Clearly, various rotating means can be applied.

The description is intended to clarify the basic idea of the invention. The invention may vary in detail within the scope of the ensuing claims.

The invention claimed is:

1. A marine vessel for sea operations, comprising:
a hull;
a propulsion arrangement including:
an internal combustion engine;
an exhaust gas arrangement;
a propulsion unit; and
at least one vertically arranged cylinder with a vertical axis, said at least one vertically arranged cylinder extending generally to a same height as a vertical height of a vertical utility structure of the marine vessel, said at least one vertically arranged cylinder being adapted to rotate around its vertical axis, the at least one vertically arranged cylinder being arranged to engage with a side wind, which engages the at least one vertically arranged cylinder, which is rotated around its vertical axis by a motor in a direction of rotation, whereby a Magnus effect generates an increased pressure on one side of the at least one vertically arranged cylinder and a decreased pressure of suction on an opposite side of the at least one vertically arranged cylinder, which results in a forward trust that moves the marine vessel forward in a direction of movement of the marine vessel,
wherein the at least one vertically arranged cylinder is arranged around a part of the exhaust gas arrangement of the marine vessel, and
wherein the part of the exhaust gas arrangement is an exhaust pipe, and the at least one vertically arranged cylinder is arranged around the exhaust pipe, the at least one vertically arranged. cylinder provides a funnel means for the exhaust pipe, the at least one vertically arranged cylinder generates an increased pressure on one side and a decreased pressure on the opposite side of the at least one vertically arranged cylinder when the side wind engages the cylinders.

2. A marine vessel according to claim 1, wherein the vertically arranged cylinder is provided with an internal support cylinder, which is arranged around the exhaust pipe.

3. A marine vessel according to claim 1, wherein the vertically arranged cylinder is arranged to act as an exhaust pipe.

4. A marine vessel according to claim 1, wherein the exhaust gas arrangement of the marine vessel comprises a silencer, and the vertically arranged cylinder is arranged around the silencer.

5. A marine vessel according to claim 1, wherein the vertically arranged cylinder is supported by a frame arranged in connection with an upper end of the vertically arranged cylinder.

6. A marine vessel according to claim 5, wherein the vertically arranged cylinder is arranged to extend through the frame.

7. A marine vessel according to claim 5, wherein the frame has a form which directs exhaust gases from the exhaust pipe in a given desired direction.

8. A marine vessel according to claim 5, wherein the frame has a form which minimizes head wind resistance.

9. A marine vessel according to claim 5, wherein the frame has a horizontal orientation and extends in a longitudinal direction of the marine vessel.

\* \* \* \* \*